United States Patent [19]
Bernier

[11] Patent Number: 4,969,623
[45] Date of Patent: Nov. 13, 1990

[54] FLIGHT DOCUMENTS ORGANIZER

[76] Inventor: Rene A. Bernier, 30021 Hickey Rd., New Baltimore, Mich. 48047

[21] Appl. No.: 317,644

[22] Filed: Mar. 1, 1989

[51] Int. Cl.$^5$ .............................................. A47B 19/00
[52] U.S. Cl. ............................... 248/441.1; 248/442.2
[58] Field of Search ............... 248/442.2, 205.2, 205.3, 248/444, 447, 447.2, 447.1, 452, 918, 451, 452, 453, 441.1; 108/44, 45; 400/718, 718.1, 718.2

[56] References Cited

U.S. PATENT DOCUMENTS

| | | | |
|---|---|---|---|
| 861,722 | 7/1907 | Haas | 248/451 X |
| 994,797 | 6/1911 | Streit | 248/447.2 X |
| 1,539,042 | 5/1925 | Dennis | 248/443 |
| 2,522,602 | 9/1950 | Burns | 108/45 X |
| 2,657,107 | 10/1953 | Bisaga et al. | 108/45 |
| 2,862,328 | 12/1958 | Wadsworth | 108/45 X |
| 2,901,860 | 9/1959 | Crawford | 248/441.1 X |
| 3,104,895 | 9/1963 | Feuerbach et al. | 108/45 X |
| 3,391,659 | 7/1968 | Cross | 108/45 |
| 3,586,847 | 6/1971 | Nahmias | 248/451 X |
| 4,666,409 | 5/1987 | Sandberg | 248/441.1 X |

OTHER PUBLICATIONS

"Yokeboard" Advertisement in *Private Pilot* Magazine Mar. 1990 Issue, p. 16.
Oshkosh Issue of Sporty's Pilot Shop Catalog, pp. 54-56, 1988.

Primary Examiner—J. Franklin Foss
Attorney, Agent, or Firm—Peter D. Keefe

[57] ABSTRACT

An organizer of documents which releasably connects to the yoke column collar of a control yoke of the type used in aircraft. The invention consists of a releasable yoke column collar attachment member, an adjustable extension arm connected to the attachment member, a writing desk removably connected to the extension arm, and a ring-type releasable binder mechanism attached to the upper end of the desk for holding pre-punched documents. The organizer according to the present invention is structured to provide a desk surface which is substantially oriented in the plane of the yoke, and located between the yoke and the pilot. Further, the invention includes a hinged side panel attached to each side of the desk for supporting oversized documents. Still further, the invention includes a spring loaded, hinged stop member at the bottom of the desk for holding larger documents, such as flight manuals from sliding off the desk.

23 Claims, 2 Drawing Sheets

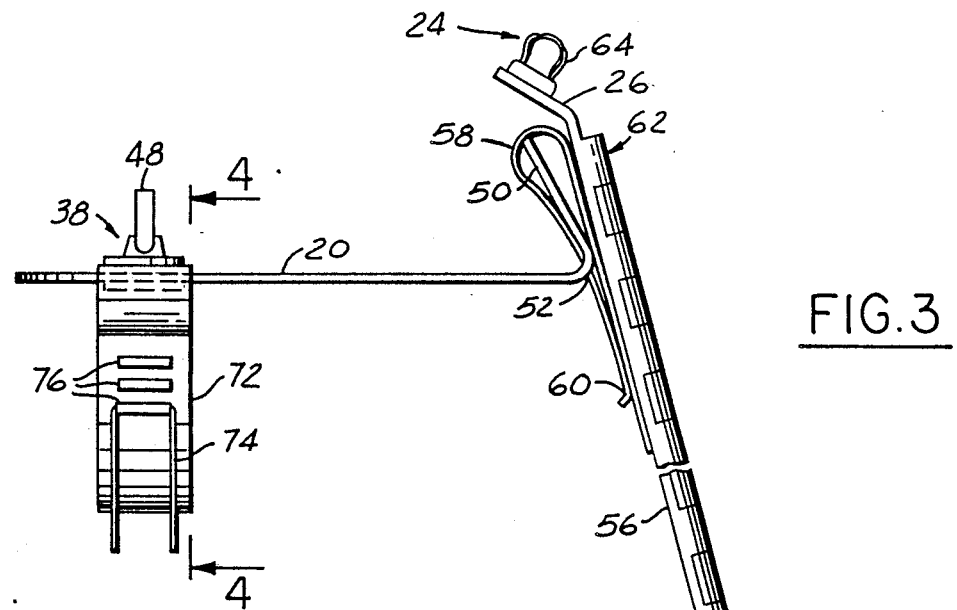
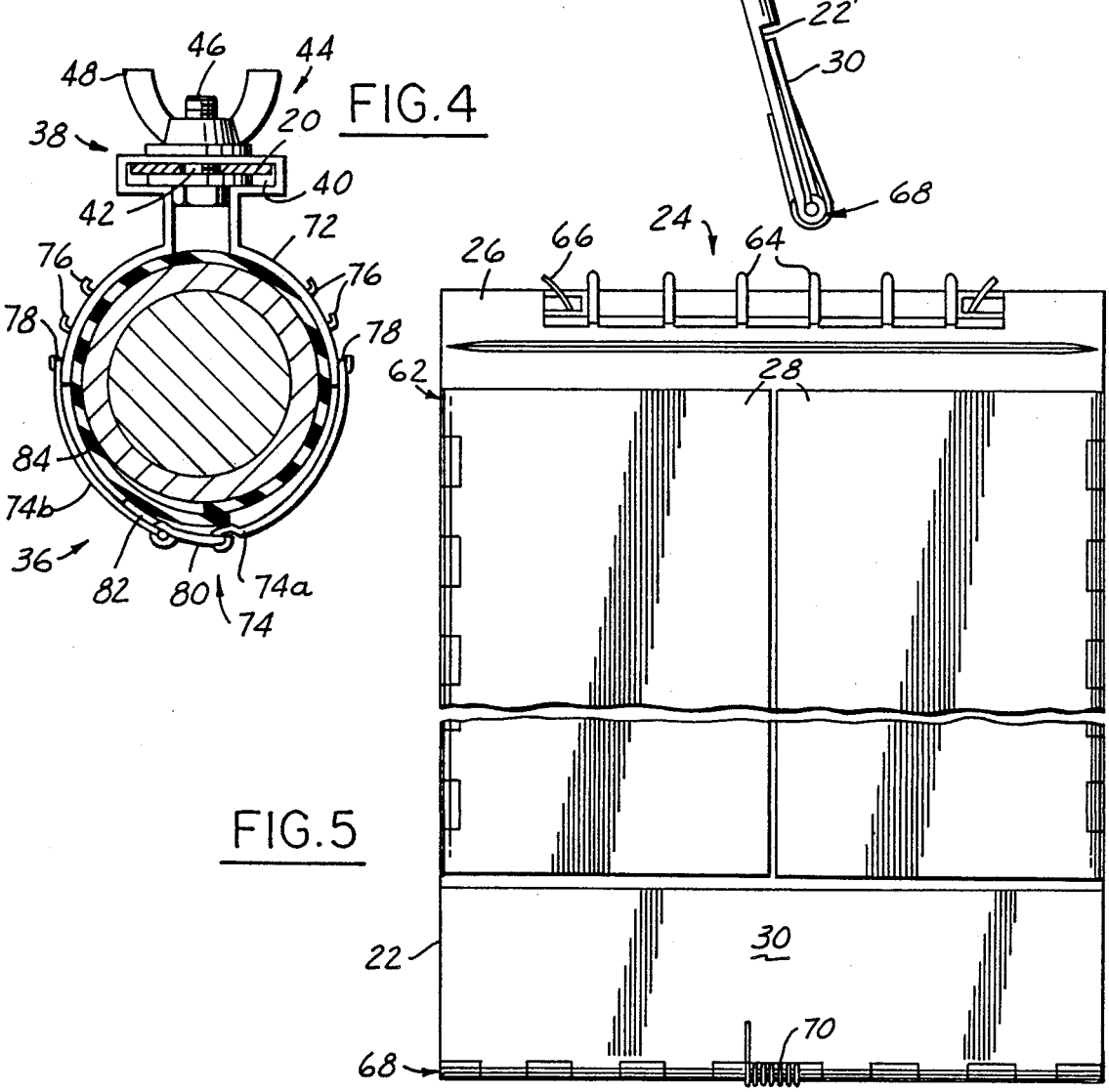

FLIGHT DOCUMENTS ORGANIZER

BACKGROUND OF THE INVENTION

1. Field of the Invention

The present invention relates to devices used to hold pilot flight documents, particularly to a flight documents holder which releasably fastens to the column of the control yoke of an airplane, and, more particularly, to a flight document holder which is structured to hold the flight documents in an organized manner which allows for ready access thereto by a pilot without interfering with control of the airplane or concealing any flight instruments or devices from the pilot.

2. Description of the Prior Art

It is well known that pilots must routinely consult pre-flight checklists, flight charts, approach plates, and other various flight operations documents, while operating an airplane. Because of both the number and awkwardness of use of these documents, it has proven difficult for pilots to comfortably and effectively consult these documents as the need arises.

In the prior art there are two classes of devices which have been developed which attempt to address the problem of facilitating document access by pilots.

The first class of devices are those which are strapped onto one thigh of the pilot by use of an adjustable strap. These devices generally have a document holder in the form of a flat base which is interconnected with the adjustable strap. A hinged plate may be included which acts as a divider between two documents only, and a pencil holder may also be included. These devices suffer from the discomfort and excessive bother associated with having to strap on and strap off the device. Additionally, these devices suffer from the fact that the pilot must continually look down at his thigh to read the documents, when he should rather be looking in a forward direction toward the instruments and windshield. Further, these devices require document manipulations which necessitate the pilot's hands being taken away from the controls. Consequently, it is considered that this class of devices does not adequately solve the problem of how to facilitate document access by pilots.

The second class of devices are those which utilize a clipboard that attaches to the column of the control yoke of the airplane. This class of devices have a releasable attachment mechanism that secures the device to the column. An adjustable arm extends outwardly from the attachment mechanism, ending in a flat board having clips for holding documents. While this class of devices better serves to solve the problem of facilitating document access by pilots, structures devised thus far do not provide for management of multiple documents, in that retrieval of a particular document is cumbersome because frequent shuffling and removal of documents from the clip require the use of both hands in order to access a selected document: one hand holds onto the board and releases pressure of the clip, while the other hand manipulates the documents. As in the first class of devices cited above, both of the pilot's hands are away from the controls. Thus, the problem remains of disorganization of the documents by flight's end, as well as the continual problem of shuffled or removed documents obscuring portions of the instrument panel, which can lead to potential in-flight safety hazards.

What is needed, therefore, is a device which is structured so as to permit organized management of multiple flight documents so that the pilot may easily sort through a number of documents without releasing control of the airplane, without losing sight of the instrument panel, and without any of the documents ever needing to be removed or ever obscuring the instruments.

SUMMARY OF THE INVENTION

The present invention is an organizer of flight documents consisting of a releasable yoke attachment member, an adjustable extension arm connected to the attachment member, a desk removably connected to the extension arm, and a ring-type releasable ring binder system attached to the upper end of the desk for holding pre-punched flight documents. The organizer according to the present invention is structured to releasably attach to the yoke column collar of the control yoke of an airplane and provide a desk surface which is substantially oriented in the plane of the control yoke, and located between the control yoke and the pilot. The desk surface serves both as resting surface for flight documents and a writing surface for the pilot.

When it is desired to review a selected flight document, the documents resting above the desired document are simply rotated on the binder rings of a ring binder system so that they are out of the way. In this manner, the pilot may, with the use of one hand continue control of the airplane and with the other hand, quickly and efficiently find a desired flight information document, without having to set other documents aside and without any other documents needing to be positioned so as to interfere with the pilot's view of the instruments.

Further, the present invention includes a hinged side panel attached to each side of the desk for supporting oversized documents, such as flight maps, thereby preventing an oversized document from assuming a visually detrimental drooping orientation at its end portions. Still further, the present invention includes a spring loaded, hinged stop member at the bottom of the desk for holding larger documents, such as flight manuals from sliding off the desk, as well as for holding both pre-punched and thicker documents that are impossible to pre-punch, such as note pads, that the pilot may place on the desk surface.

Accordingly, it is an object of the present invention to provide an organizer for multiple flight documents which permits a pilot to continue exercising control of the airplane, while efficiently finding a particular document without the other documents being moved into a position which can conceal flight instruments.

It is a further object of the present invention to provide an organizer for multiple flight documents which includes a desk having a ring binder system for effectuating efficient location of a particular document.

It is another object of the present invention to provide an organizer for multiple flight documents which is adjustable so that the desk surface of the organizer may be positioned to permit the pilot to review documents comfortably and safely by looking in a forward direction generally defined by the location of the control yoke, thereby being free to continually scan the sky, the instruments and the flight documents.

It is still a further object of the present invention to provide an organizer for multiple flight documents which is releasably attachable to the yoke column collar of the control yoke in an easy and simple manner.

It is still another object of the present invention to provide an organizer for multiple flight documents in which the desk forms a writing surface and is conveniently removable from the remaining portion of the organizer.

It is yet a further object of the present invention to provide an organizer for multiple flight documents which includes hinged side panels on each side of the desk for supporting edge portions of oversized documents.

It is yet another object of the present invention to provide an organizer for multiple flight documents which includes a spring loaded, hinged panel on the bottom of the desk for holding sheet documents and articles, such as flight manuals, from sliding onto the lap of the pilot.

These, and additional objects, advantages, features and benefits of the present invention will become apparent from the following specification.

BRIEF DESCRIPTION OF THE DRAWINGS

FIG. 3 is a side view of the flight document organizer of FIG. 1.

FIG. 4 is a part sectional end view of the flight document organizer seen along lines 4—4 in FIG. 3.

FIG. 5 is a plan view of the flight document organizer of FIG. 1.

DETAILED DESCRIPTION OF THE PREFERRED EMBODIMENT

Figure 1:
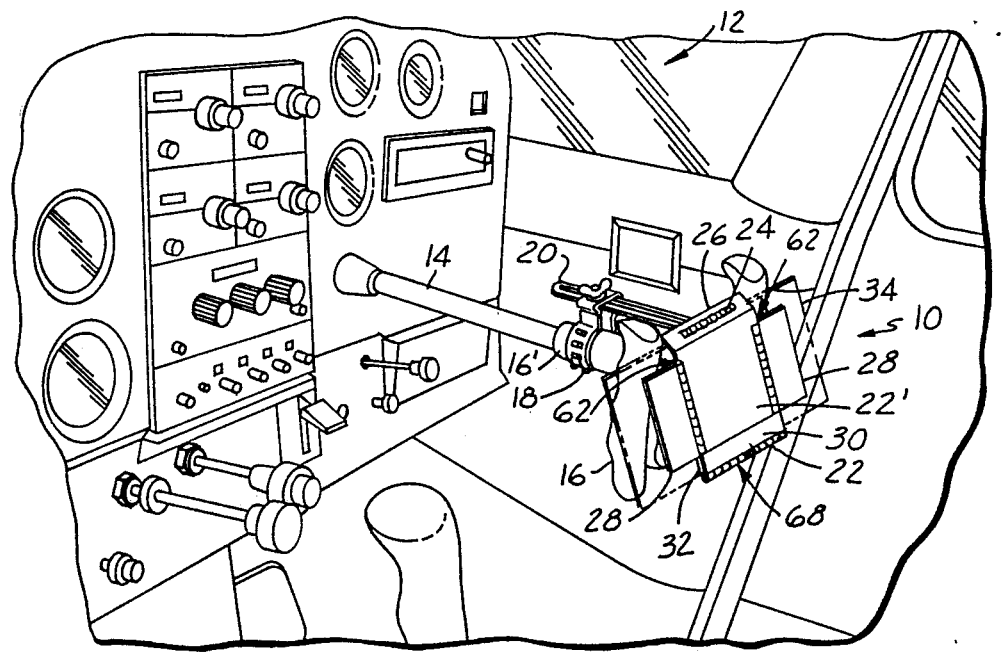
FIG. 1 is a perspective view of the flight document organizer according to the present invention in operation in an airplane.

Referring now to the Drawing, FIG. 1 shows the document organizer 10 according to the present invention in use in the cockpit of an airplane. The document organizer 10 is structured to releasably attach to either the yoke column 14 or, most preferably, the yoke column collar 16' of the control yoke 16. The document organizer 10 is composed generally of a yoke column collar attachment member 18, an extension arm 20 which is slidably connected with the attachment member, a desk 22 releasably connected with the extension arm, a ring binder system 24 connected with the upper end 26 of the desk, a hinged side panel 28 on each side of the desk, and a spring loaded, hinged stop panel 30 located at the bottom end 32 of the desk. It will be seen from FIG. 1 that even an oversized document 34 can be accommodated by the desk 22 when the side panels 28 are folded into an orientation which is in the plane of the desk.

Figure 2:
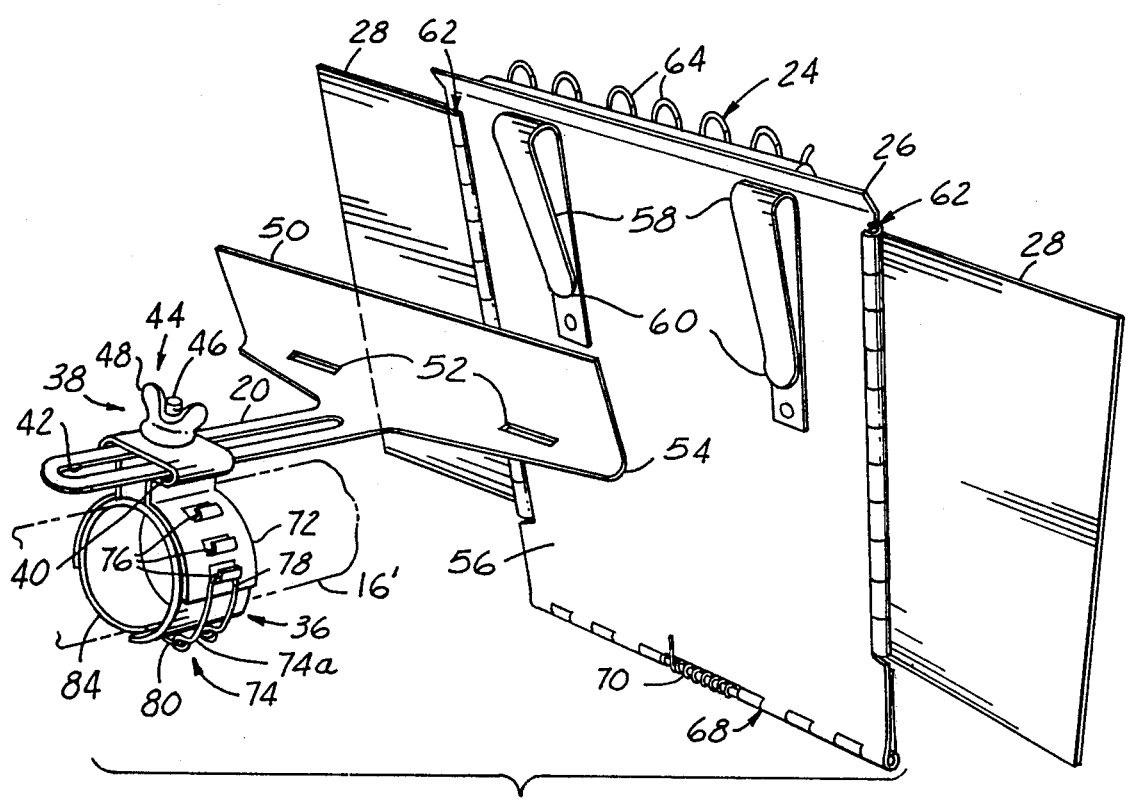
FIG. 2 is a perspective view of the flight document organizer of FIG. 1, seen from the rear.

FIGS. 2 through 5 particularly show the structure and assembly of the document organizer 10. The preferred structure of the attachment member 18 is that of a quick release latch system 36 that is sized to fit tightly about the periphery of the yoke column collar 16'. The preferred operational structure of the quick release latch system 36 will be discussed in detail below. An upper portion 38 of the quick release latch system 36 of the attachment member 18 includes a control slot 40 for receiving the extension arm 20. The portion of the extension arm that is intended to insert into the control slot 40 has a longitudinal slot 42. The upper portion 38 of the quick release latch system 36 includes a fastening device 44 which is preferred to be in the form of a bolt 46 linking both the control slot 40 and the longitudinal slot 42, with a wing nut 48 threaded thereonto. By loosening the wing nut 48, the extension arm 20 may be slid through the control slot 40 along the length of the longitudinal slot 42. The extension arm 20 terminates in a support flange 50. The support flange includes slots 52 located at the base 54 of the support flange. The rear side 56 of the desk 22 includes a pair of spring clips 58 which are mutually spaced so as to match the locations of the slots 52 in the support flange 50. The desk 22 may be releasably connected with the extension arm 20 by placing each of the spring clips 58 onto the support flange until the ends 60 of the spring clips insert into respective slots 52 and the desk is firmly seated on the support flange 50. It will further be seen from FIG. 2 that each of the side panels 28 are connected to the edge of the desk by a hinge 62 that is preferred to be integrally formed at the respectively mating edges of both the desk 22 and the side panels 28. It is preferred that the side panels be rotatable between an orientation which is flat onto the surface 22' of the desk 22, as is shown in FIGS. 3 and 5, and a maximum orientation which is parallel to the surface 22' of the desk, as is shown in FIG. 2.

In order to hold and organize multiple flight information documents, a ring binder system 24 is attached at the upper end 26 of the desk 22, as can best be seen from FIGS. 3 and 5. The ring binder system 24 is of a generally conventional structure, having preferably six rings 64, although other numbers of rings are quite acceptable. It is preferred to include a ring release 66 with the ring binder system 24 to facilitate placing on, and removing from, the rings 64 various selected pre-punched flight documents. It is further preferred that the upper end 26 of the desk 22 be slanted toward the extension arm 20, as shown best in FIG. 3, so that the flipping of documents along the rings 64 is made easier and the flipped document sheets will lay more orderly on the extension arm 20.

The stop panel 30, which is located at the bottom end 32 of the desk 22, is structured to be connected to the desk by a hinge 68 that is preferred to be integrally formed at the respectively mating edges of the desk 22 and the stop panel 30. The stop panel is biased by a resilient member, such as a spring 70, so that the stop panel 30 resiliently biases against the surface 22' of the desk 22. It is preferred that the orientation of the stop panel 30 be rotatable from an orientation in which the stop panel rests against the desk surface 22', as shown in FIG. 5, to a maximum orientation in which the stop panel is oriented perpendicular to the desk surface. In the former orientation, the stop panel effects to hold document sheets against the desk surface 22', while in the latter orientation, the stop panel effects to prevent objects, such as a flight manual, from slipping off the desk onto the lap of the pilot.

The structure of the attachment member 18 is best indicated with reference to FIG. 4. The quick release latch system 36 is composed of two parts, an upper band part 72 which is integral with the upper portion 38 and forms a semi-circular arc, and a lower wire part 74 which selectively couples onto the upper band part 72 and which forms a complementary semi-circular arc. The upper band part 72 and the lower wire part 74 couple to encircle the yoke column collar 16'. On either side of the upper band part 72 is a plurality of nibs 76. On either side of the lower wire part 74 are U-shaped end portions 78 which are located for selectively receiving the nibs 76. After the appropriate nibs have been selected so that the quick release latch system 36 properly fits the particular control yoke collar of the airplane, one of the nibs may be pinched to permanently retain the U-shaped end portion 78 located therein. When the U-shaped end portions 78 are received in the selected nibs 76, the lower wire part 74 is tightened against the yoke column collar 16'. This is accomplished by constructing the lower wire part 74 out of two half-parts 74a and 74b which are linked by a rotatable off-set cam portion 80. Rotation of the off-set cam portion 80 is achieved by movement of a cam lever 82. It is preferred to include a resilient gasket 84 between the quick release latch system 36 and the yoke column collar 16' so as to reduce slippage of the attachment member 18 on the yoke column collar 16' when the cam lever 82 is rotated so as to clamp the lower wire part 74 and the upper band part 72 onto the yoke column collar 16'.

In operation, the pilot first selects various flight documents that are needed for a particular flight. These are pre-punched and then placed onto the rings 64 of the ring binder system 24. The attachment member 18 is secured loosely to the yoke column collar 16' by selecting a set of nibs 76 for coaction with a set of U-shaped end portions 78. The cam lever 82 is then rotated causing the off-set cam portion 80 to press the lower wire part 74 with respect to the upper band part 72, thus securing the quick release latch system 36 of the attachment member 18 onto the yoke column collar 16'. Next, the extension arm 20 is moved along the longitudinal slot 42 so as to place the support flange 50 at a location conveniently forward of the control yoke 16. The wing nut 48 is then tightened. Next, the desk 22 is attached to the support flange 50 by sliding the spring clips 58 over the support flange so that the ends 60 insert into the slots 52 and the desk seats securely onto the support flange. The desk is then positioned to a location which is adjacent the control yoke, between the control yoke and the pilot, and oriented substantially in a plane parallel to that defined by the control yoke, by adjusting the the location of the attachment member 18 on the yoke collar 16' or the extension arm 20 relative to the attachment member 18, as desired.

When it is desired to reference a particular flight document, the pilot flips through the documents on the rings until the desired one appears. Flipping of the documents is easily accomplished by rotating the documents about the rings 64 so that the flipped documents come to rest on the extension arm 20. In the event a large document is consulted, for instance one which must be unfolded to a larger size, the side panels 28 may be rotated so as to be oriented in the plane of the desk surface 22' in order to help support the document. In the event loose sheets are referenced, they may be held securely to the desk by action of the biasing force of the stop panel 30. If an article, such as a manual, is consulted, the stop panel will rotate to a position perpendicular to the desk and thereby prevent the article from sliding off the desk.

To those skilled in the art to which this invention appertains, the above described preferred embodiment may be subject to change or modification. For instance, many other kinds of quick release clamps are known in the art which could be adapted for use in connection with the attachment member 18. Also, it is possible to utilize any number of pre-punched plastic or paper pockets for holding materials, each pocket and its contents forming a pre-punched document releasably held on the rings of the ring binder system. Further, it is suggested that, in order to maximize the life of paper sheet documents, they be plastic laminated. Additionally, a pencil holder or other holder for miscellaneous items, such as a timer, can readily be added by those skilled in the art to the hereinabove described preferred embodiment of the document organizer 10. Such change or modification can be carried out without departing from the scope of the invention, which is intended to be limited only by the scope of the appended claims.

What is claimed is:

1. A document organizer for mounting to a yoke column collar of a control yoke of a vehicle such that an operator may have an unobstructed view of instruments of an instrument panel located adjacent said yoke column collar, said document organizer comprising:
   a desk having a desk surface and a rear surface;
   an extension arm having a first end and a second end, said first end of said extension arm having a support flange, said second end of said extension arm having a longitudinal slot;
   connection means on said rear surface of said desk and said support flange for releasably connecting said desk onto said support flange of said extension arm; and
   attachment member means for releasably attaching to said yoke column collar and for selectively fastening said second end of said extension arm onto said attachment member means along said longitudinal slot of said extension arm;
   said document organizer being structured so that said attachment member may be secured to said yoke column collar, and said desk may then be located adjacent said control yoke in an orientation substantially in a plane parallel to a plane defined by said control yoke, yet operation of said control yoke will not be interferred with by said desk.

2. The document organizer of claim 1, wherein said desk has an upper end and a lower end, said document organizer further comprising ring binder means located at an upper end of said desk surface of said desk for releasably holding pre-punched documents.

3. The document organizer of claim 2, wherein said upper end of said desk is angled toward said extension arm so as to facilitate flipping said pre-punched documents on said ring binder and further so that any of said pre-punched documents that are flipped may rest on said extension arm.

4. The document organizer of claim 2, wherein said desk has a first edge and a second edge, said document organizer further comprising a side panel hingably connected to each of said first and second edges of said desk.

5. The document organizer of claim 4, wherein each of said side panels may be rotated from an orientation in which each of said side panels may lay flat on said desk surface to a maximum orientation in which each of said side panels substantially lie in a plane which is defined by said desk surface.

6. The document organizer of claim 5, further comprising a stop panel hingably connected to said lower end of said desk; and biasing means connected between said stop panel and said desk for biasing said stop panel against said desk surface.

7. The document organizer of claim 6, wherein said stop panel may be rotated from an orientation in which said stop panel lies flat on said desk surface to an orientation in which said stop panel is substantially perpendicular to said desk surface.

8. The document organizer of claim 7, wherein said attachment member means comprises:
   quick release latch means for selectively clamping around said yoke column;
   an upper portion connected with one end of said quick release latch means, said upper portion having a control slot for receiving said extension arm; and
   fastening means for selectively holding said extension arm in said control slot at a predetermined location along said longitudinal slot of said extension arm.

9. The document organizer of claim 8, wherein said support flange has a base defining a location on said extension arm where said support flange begins; wherein further said connection means comprises a plurality of spring clips connected with said rear surface of said desk; and wherein further said support flange of said extension arm has a plurality of slots located at said base, said plurality of spring clips receiving said support flange and each said slot of said plurality of slots receiving a respective spring clip of said plurality of spring clips when said desk is connected to said support flange.

10. A document organizer for mounting to a yoke column collar of a control yoke of a vehicle such that an operator may have an unobstructed view of instruments of an instrument panel located adjacent said yoke column collar, said document organizer comprising:
   a desk having a desk surface for writing and a rear surface, said desk further having an upper end and a lower end;
   ring binder means located at an upper end of said desk surface of said desk for releasably holding pre-punched documents;
   an extension arm having a first end and a second end, said first end of said extension arm having a support flange, said second end of said extension arm having a longitudinal slot;
   connection means on said rear surface of said desk and said support flange for releasably connecting said desk onto said support flange of said extension arm; and
   attachment member means for releasably attaching to said yoke column collar and for selectively fastening said second end of said extension arm onto said attachment member means along said longitudinal slot of said extension arm;
   said document organizer being structured so that said attachment member may be secured to said yoke column collar, and said desk may then be located adjacent said control yoke in an orientation substantially in a plane parallel to a plane defined by said control yoke, yet operation of said control yoke will not be interferred with by said desk.

11. The document organizer of claim 10, wherein said desk has a first edge and a second edge, said document organizer further comprising a side panel hingably connected to each of said first and second edges of said desk.

12. The document organizer of claim 11, wherein said upper end of said desk is angled toward said extension arm so as to facilitate flipping said pre-punched documents on said ring binder and further so that any of said pre-punched documents that are flipped may rest on said extension arm.

13. The document organizer of claim 11, wherein each of said side panels may be rotated from an orientation in which each of said side panels may lay flat on said desk surface to a maximum orientation in which each of said side panels substantially lie in a plane which is defined by said desk surface.

14. The document organizer of claim 13, further comprising a stop panel hingably connected to said lower end of said desk; and biasing means connected between said stop panel and said desk for biasing said stop panel against said desk surface.

15. The document organizer of claim 14, wherein said stop panel may be rotated from an orientation in which said stop panel lies flat on said desk surface to an orientation in which said stop panel is substantially perpendicular to said desk surface.

16. The document organizer of claim 15, wherein said attachment member means comprises:
   quick release latch means for selectively clamping around said yoke column;
   an upper portion connected with one end of said quick release latch means, said upper portion having a control slot for receiving said extension arm; and
   fastening means for selectively holding said extension arm in said control slot at a predetermined location along said longitudinal slot of said extension arm.

17. The document organizer of claim 16, wherein said support flange has a base defining a location on said extension arm where said support flange begins; wherein further said connection means comprises a plurality of spring clips connected with said rear surface of said desk; and wherein further said support flange of said extension arm has a plurality of slots located at said base, said plurality of spring clips receiving said support flange and each said slot of said plurality of slots receiving a respective spring clip of said plurality of spring clips when said desk is connected to said support flange.

18. A document organizer for mounting to a yoke column collar of a control yoke of a vehicle such that an operator may have an unobstructed view of instruments of an instrument panel located adjacent said yoke column collar, said document organizer comprising:
   a desk having a desk surface for writing and a rear surface, said desk further having an upper end and a lower end, said desk further having a first edge and a second edge;
   ring binder means located at an upper end of said desk surface of said desk for releasably holding pre-punched documents;
   a side panel hingably connected to each of said first and second edges of said desk;
   a stop panel hingably connected to said lower end of said desk;
   biasing means connected between said stop panel and said desk for biasing said stop panel against said desk surface;
   an extension arm having a first end and a second end, said first end of said extension arm having a support flange, said second end of said extension arm having a longitudinal slot;
   connection means on said rear surface of said desk and said support flange for releasably connecting said desk onto said support flange of said extension arm; and
   attachment member means for releasably attaching to said yoke column collar and for selectively fastening said second end of said extension arm onto said attachment member means along said longitudinal slot of said extension arm;

said document organizer being structured so that said attachment member may be secured to said yoke column collar, and said desk may then be located adjacent said control yoke in an orientation substantially in a plane parallel to a plane defined by said control yoke, yet operation of said control yoke will not be interferred with by said desk.

19. The document organizer of claim 18, wherein said upper end of said desk is angled toward said extension arm so as to facilitate flipping said pre-punched documents on said ring binder and further so that any of said pre-punched documents that are flipped may rest on said extension arm.

20. The document organizer of claim 19, wherein each of said side panels may be rotated from an orientation in which each of said side panels may lay flat on said desk surface to a maximum orientation in which each of said side panels substantially lie in a plane which is defined by said desk surface.

21. The document organizer of claim 20, wherein said stop panel may be rotated from an orientation in which said stop panel lies flat on said desk surface to an orientation in which said stop panel is substantially perpendicular to said desk surface.

22. The document organizer of claim 21, wherein said attachment member means comprises:
quick release latch means for selectively clamping around said yoke column collar;
an upper portion connected with one end of said quick release latch means, said upper portion having a control slot for receiving said extension arm; and
fastening means for selectively holding said extension arm in said control slot at a predetermined location along said longitudinal slot of said extension arm.

23. The document organizer of claim 22, wherein said support flange has a base defining a location on said extension arm where said support flange begins; wherein further said connection means comprises a plurality of spring clips connected with said rear surface of said desk; and wherein further said support flange of said extension arm has a plurality of slots located at said base, said plurality of spring clips receiving said support flange and each said slot of said plurality of slots receiving a respective spring clip of said plurality of spring clips when said desk is connected to said support flange.

* * * * *